(12) United States Patent  (10) Patent No.: US 7,646,122 B2
Uchiumi et al.  (45) Date of Patent: Jan. 12, 2010

(54) FIXING HOLDER FOR VIBRATION GENERATING DEVICE

(75) Inventors: Hidehiro Uchiumi, Saitama (JP); Kazuo Morita, Tokyo (JP)

(73) Assignee: Namiki Seimitsu Houseki Kabushiki Kaisha (JP)

( * ) Notice: Subject to any disclaimer, the term of this patent is extended or adjusted under 35 U.S.C. 154(b) by 336 days.

(21) Appl. No.: 11/631,314

(22) PCT Filed: Jun. 29, 2005

(86) PCT No.: PCT/JP2005/011956

§ 371 (c)(1),
(2), (4) Date: Jan. 3, 2007

(87) PCT Pub. No.: WO2006/006403

PCT Pub. Date: Jan. 19, 2006

(65) Prior Publication Data

US 2007/0253178 A1  Nov. 1, 2007

(30) Foreign Application Priority Data

Jul. 8, 2004 (JP) ............................. 2004-202387

(51) Int. Cl.
  *H02K 7/06* (2006.01)
  *H02K 5/22* (2006.01)
(52) U.S. Cl. .................. 310/81; 310/71; 310/91
(58) Field of Classification Search ............ 310/81, 310/91, 71
  See application file for complete search history.

(56) References Cited

U.S. PATENT DOCUMENTS 5,657,205 A * 8/1997 Tamaru et al. .............. 361/761
5,898,248 A   4/1999 Ikeda et al.
6,081,055 A * 6/2000 Narusawa ................... 310/81
6,133,657 A * 10/2000 Semenik et al. ............. 310/81

(Continued)

FOREIGN PATENT DOCUMENTS

JP  08-51286  2/1996

(Continued)

OTHER PUBLICATIONS

International Search Report for PCT/JP2005/011956 Dated Sep. 6, 2005.

*Primary Examiner*—Burton Mullins
(74) *Attorney, Agent, or Firm*—Studebaker & Brackett PC; Donald R. Studebaker

(57) ABSTRACT

A fixing structure capable of adjusting the dimensions in the vertical direction of a vibration generating device including a circuit board in combination with the circuit board without reducing the size or the diameter of the vibration generation device. A fixing holder in a holder shape for holding or including at least a part of the outer circumference of a vibration generating device has an inner circumferential surface substantially identical to the external shape of the vibration generating device. Groove-like rail parts are provided partially in the outer circumferential surface of the holder at the opposite ends thereof in the same linear direction, and the side end part of a notched circuit board or a part on the housing side of the apparatus is inserted into each of the groove-like rail parts, thus holding and securing the vibration generating device at an arbitrary vertical position against the surface of the circuit board in the apparatus.

11 Claims, 9 Drawing Sheets

U.S. PATENT DOCUMENTS

| | | |
|---|---|---|
| 6,271,610 B1 | 8/2001 | Ibata et al. |
| 6,388,349 B1 | 5/2002 | Ioka et al. |
| 6,954,015 B2 * | 10/2005 | Segawa ........................ 310/71 |
| 7,023,114 B2 * | 4/2006 | Takagi et al. .................. 310/81 |
| 7,119,463 B2 * | 10/2006 | Chen et al. ..................... 310/81 |
| 7,268,673 B2 * | 9/2007 | Wolff ....................... 340/407.1 |
| 2006/0138885 A1 | 6/2006 | Uchiumi et al. |

FOREIGN PATENT DOCUMENTS

| | | |
|---|---|---|
| JP | 9-290214 | 11/1997 |
| JP | 10-108399 | 4/1998 |
| JP | 11-233183 | 8/1999 |
| JP | 2000-078790 | 3/2000 |
| JP | 2001-095200 | 4/2001 |
| JP | 2004-215382 | 7/2004 |
| WO | WO99/23801 | 5/1999 |

* cited by examiner (a) Prior Art (b) Prior Art (c) Prior Art (a)  
Prior Art (b)  
Prior Art

FIXING HOLDER FOR VIBRATION GENERATING DEVICE

BACKGROUND OF THE INVENTION

1. Field of the Invention

This invention relates to a device for generating vibration that is mainly mounted in a portable apparatus (including such electronic devices as a mobile phone, a PHS, a small wireless communications device, and other various portable information communications terminals) to perform a soundless alarm function, specifically to a holding structure of a circuit board in a housing of a portable communication device and the device for generation vibration mounted on the circuit board, and a fixing holder to position the fixing point of the device for generation vibration.

2. Description of Related Art

A sudden incoming ring tone of a portable apparatus may sometimes disturb others in, for example, a quiet public space such as an art gallery and a concert hall with many people in a room for important commercial negotiations or conferences. Therefore, a wireless alarm function using a device for generating vibration to report an incoming signal with sensible vibration (generally called "manner mode") is mounted in various portable apparatuses.

The devices for generating vibration can mainly be classified into two types from the viewpoint of structures. One of these is a so-called motor for generating vibration using a cylindrical or flat type small motor (hereafter briefly referred to as a vibration motor, as required), and the other is a so-called multi-functional device equipped with both sound and buzzer functions of a speaker drive type in which a magnetic circuit section is reciprocated by low frequency signals (or a vibration linear device specialized for vibration function hereafter collectively referred to as a vibration actuator, briefly, as required).

In the case of the aforementioned vibration motor, a portable apparatus such as a mobile phone is vibrated by providing a rotating shaft driven by the motor with a weight having an eccentric center of gravity or with a deflecting member to utilize an unequal load due to centrifugal force caused by eccentric rotation of the weight etc. having an eccentric center of gravity during rotor operation. As such various portable apparatuses are used more popularly, the percentage of apparatuses equipped with such mechanism and frequency of using such mechanism are increasing day by day.

Similarly, the aforementioned vibration actuator equipped with both the vibration generating function of the magnetic circuit section by low frequency signals and the sounding function within a human voice range can be replacing the existing speaker and can realize highly efficient use of installation space because of adoption of a flat type multifunctional integral part and is more widely used corresponding to each application. Especially recent mobile phones and PHSs, which have become popular and of which the size is greatly reduced, are efficiently equipped with these two types of devices for generating vibration in their limited mounting spaces in the housings.

In the housings of these portable apparatuses, a power supply method from a power source (mainly circuit board) to a main unit of a device for generating vibration and its holding structure is improved day by day. For example, instead of a conventional connecting method such as using a soldered lead wire or a connector, a structure having a combination of an elastic pressing body and a leaf spring-like power supply terminal or a structure having a power supply terminal directly connected to a circuit board by soldering are newly examined.

For instance, a power supply terminal structure shown in FIGS. 7 and 8 is conventionally used as a method in which the aforementioned vibration motor can be built into a housing of a main unit of a portable communication apparatus (hereafter briefly referred to as an apparatus main unit, as required) in relatively few man-hours for assembly and which enables a direct power supply from a circuit board to a motor main unit.

Power supply terminals 104 shown in FIG. 7 are arranged on a terminal block 110 on which an end of a housing case 103 of a vibration motor 101 having a weight 106 is to be mounted and comprises leaf springs, one end of each of which is soldered to the terminal at a connecting portion 104e and in which a part of each strip plate extending from the aforementioned terminal block 110 to a contact portion 104d is bent at a bending portion 104f.

The contact portion 104d at a forward end of a movable portion of the power supply terminal 104 is pressed onto a power supply land 55 of a circuit board 50 provided in the apparatus main unit housing 200 by allowing the power supply terminal 104 to be elastically deformed at this bending portion 104f as shown in FIG. 8. In addition, there is a method in which an elastic spring body 130g is arranged between the power supply terminal 104 and a housing case 103 as a part of a holder 130 covering the aforementioned housing case 103 and is combined with a housing of the apparatus main unit housing 200 to press the contact portion 104d of the power supply terminal 104 onto the power supply land 55 utilizing the interaction between the rubber elasticity of a convex section of the aforementioned elastic pressing body 130g and leaf spring elasticity of the aforementioned power supply terminal 104 as shown in FIG. 8 (*b*) (for example, see patent references 1 through 3).

Patent reference 1: JP 2000-78790A

Patent reference 2: WO99/23801A

Patent reference 3: JP 2001-95200A

Since the vibration motor 102, for example, shown in FIG. 8 according to the Patent Reference stated above is mounted on a plate of a circuit board 50 with a power supply terminal 104 inserted between an elastic pressing body 130g of a holder 130 for holding the vibration motor 102, there is a problem that an excessively large space is occupied in a direction of the height inside a housing of a portable apparatus 200, leading to dissatisfaction of a development criterion that requires a compact mobile communications device.

In fact, the minimum outside diameter of a current cylindrical vibration motor is 4 mm, while a total height of the vibration motor with the elastic holder 130 in between is approximately 5 mm, which is extremely large compared to other electronic parts mounted on a circuit board. In particular, with the demand for a reduction in the size and height of a mobile communications device represented by a mobile phone, the problem to overcome was an arrangement of a device for generating vibration for the vibration motor enabling a compact mobile device. Moreover, there were many problems in a mounting method of the vibration motor 102 such that it is difficult to obtain a sufficient level of vibration for a user because a diameter of an eccentric weight 106 was decreased along with a decrease in a diameter of the vibration motor 102.

SUMMARY OF THE INVENTION

In order to solve these problems, the inventors proposed, in the previous application, a design for satisfying compactness by arranging a vibration motor in a space made by cutting off a part of a circuit board and inserting the circuit board as a support member at a position of the center of a thickness in a direction of the height of a device for generating vibration, and integrally incorporating the device for generating vibration at a central position of a thickness of the circuit board. In the circuit board, however, since many electronic parts for configuring an electronic circuit are arranged so that the height of each part is in alignment with each other in a thickness direction of the circuit board, it was necessary to add a function enabling adjustment of a vertical position to a mounting holder in order to accommodate the thickness of the vibration device within that height.

Thus, the purpose of this invention is to provide a structure for holding a device for generating vibration and for adjusting a vertical position of the device main unit on the circuit board and a holder for mounting the device for generating vibration capable of realizing a reliable mounting structure to solve the above-mentioned problems. Furthermore, the purpose of this invention is to simultaneously realize both a structure for mounting the device for generating vibration that avoids the stress caused excessive load from acting on the circuit board and a holding structure capable of transmitting vibration to a housing of a mobile communications device.

In order to achieve the aforementioned purpose, an embodiment of the invention provides a holder for mounting a device for generating vibration, wherein the holder is provided with a mounting means for fixing a main unit of the device for generating vibration supported by the holder in a space made by cutting off a part of a circuit board to be mounted in a housing of a portable apparatus at an arbitrary vertical position against a surface of the circuit board in a condition of holding or including at least a part of an outer periphery of a device for generating vibration.

The invention further provides a holder for mounting a device for generating vibration, wherein an inner peripheral surface of the holder is formed in a shape almost identical to an external shape of a device for generating vibration, groove-like rail sections are provided in an outer peripheral surface of the holder at both ends thereof at the same vertical position, and side edges of the cut off circuit board or parts of a housing of a portable apparatus are inserted into the groove-like rail sections, thus holding the device for generating vibration at an arbitrary vertical position against the surface of the circuit board arranged inside the device.

The invention further provides a holder for mounting a device for generating vibration, wherein a power supply land of the circuit board and a power supply terminal of the device for generating vibration are strongly pressed onto each other using the elasticity of a mounting component used as a holder by an action of assembling the device housing so as to be electrically connected when the device for generating vibration is installed on the circuit board inside the device housing.

The invention further provides a holder for mounting a device for generating vibration, wherein a mounting component used as the holder is made of a rubber type elastic material or a resin type insulation material.

The invention further provides a holder for mounting a device for generating vibration, wherein a part of an inner peripheral surface of the holder is formed in a shape almost identical to an external shape of a device for generating vibration, wing-shaped protrusions are provided at both sides of an outer peripheral surface of the holder at the same vertical position, and one surface of the wing-shaped protrusion is soldered to a solder reflow fixing surface positioned at each surface close to an internal edge of the cut off circuit board, thus holding and fixing the device for generating vibration at an arbitrary vertical position against the surface of the circuit board inside the device.

The invention further provides a holder for mounting a device for generating vibration, wherein a mounting component used as the holder is made of a metal material or a spring-like metal material.

As described above, the mounting holder enables the mounting of the device for generating vibration in a space made by cutting off a circuit board mounted inside a housing of a portable apparatus at an arbitrary vertical position against the circuit board surface and holding or including a part of an outer periphery of the device for generating vibration. The arbitrary position means that a ratio of upper and lower dimensions of the device for generating vibration positioned against the circuit board is adjustable, and an offset value of the circuit board position from the central axis of the device for generating vibration can be calculated from this ratio.

Figure 1:
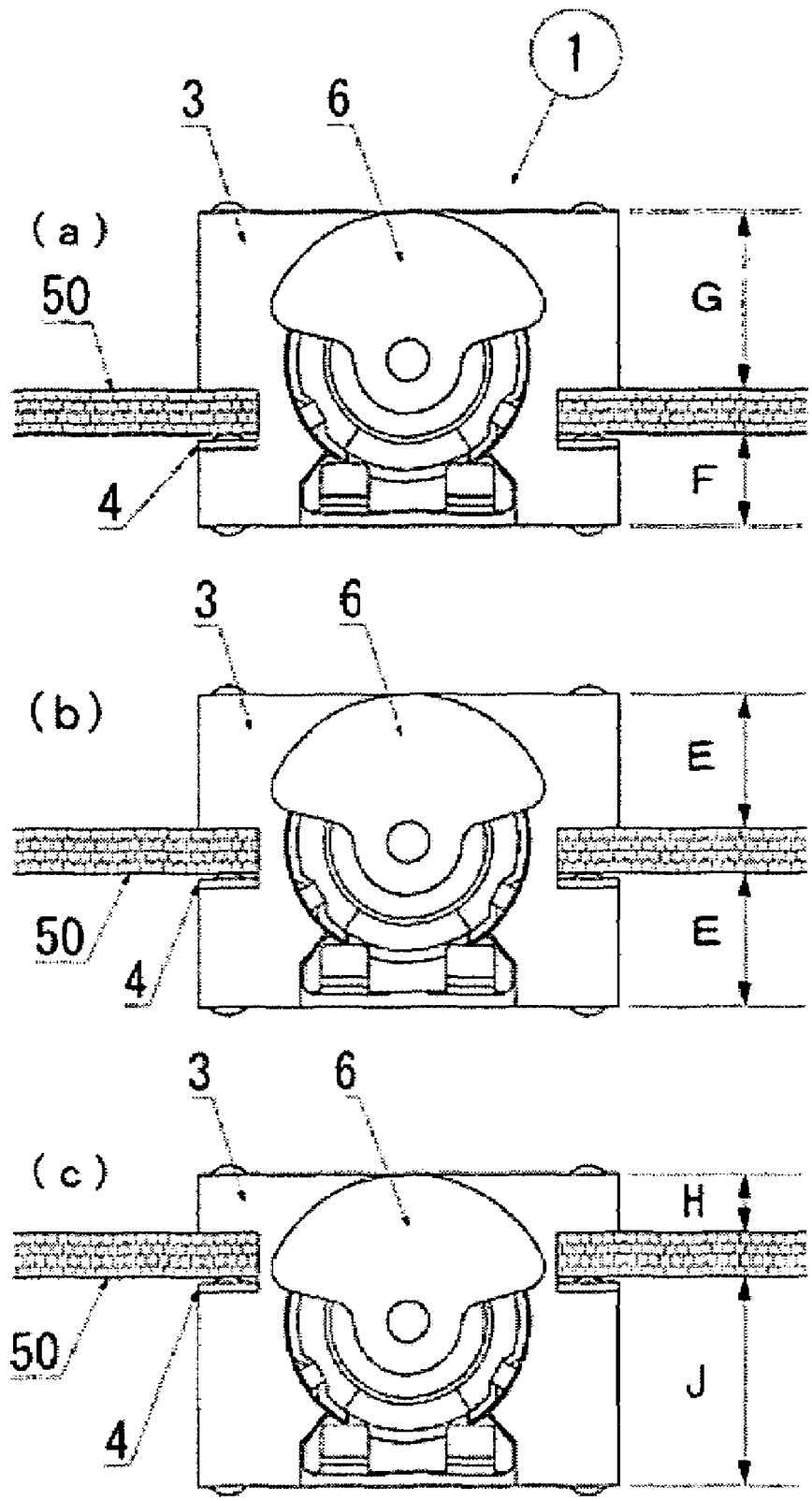
FIGS. 1(*a*), 1(*b*), and 1(*c*) are schematic views showing typical arrangements of a holder for mounting a device for generating vibration according to the invention.

More specifically, a ratio of an upper dimension to a lower dimension of the device for generating vibration against the surface of the circuit board 50 can be freely adjusted when designing the parts of the circuit board depending on the dimensions of neighboring electronic parts, for example, so as to be F to G, E to E, and H to J shown in (a), (b), and (c) of FIG. 1. Thus a thickness of a mobile communications device can be further reduced, a device for generating vibration can be mounted in a housing without a size reduction, and a vibration force identical to that of a conventional device for generating vibration can be obtained without changing a diameter of a weight 6.

In addition to the effect of the presently claimed invention, the mounting holder can hold a device for generating vibration at an arbitrary vertical position against a circuit board in the holder by providing groove-like rail sections to both sides of the holder at the same vertical position and inserting internal side edges of the cut off circuit board or parts of a housing of a portable apparatus into the groove-like rail sections.

Figure 2:
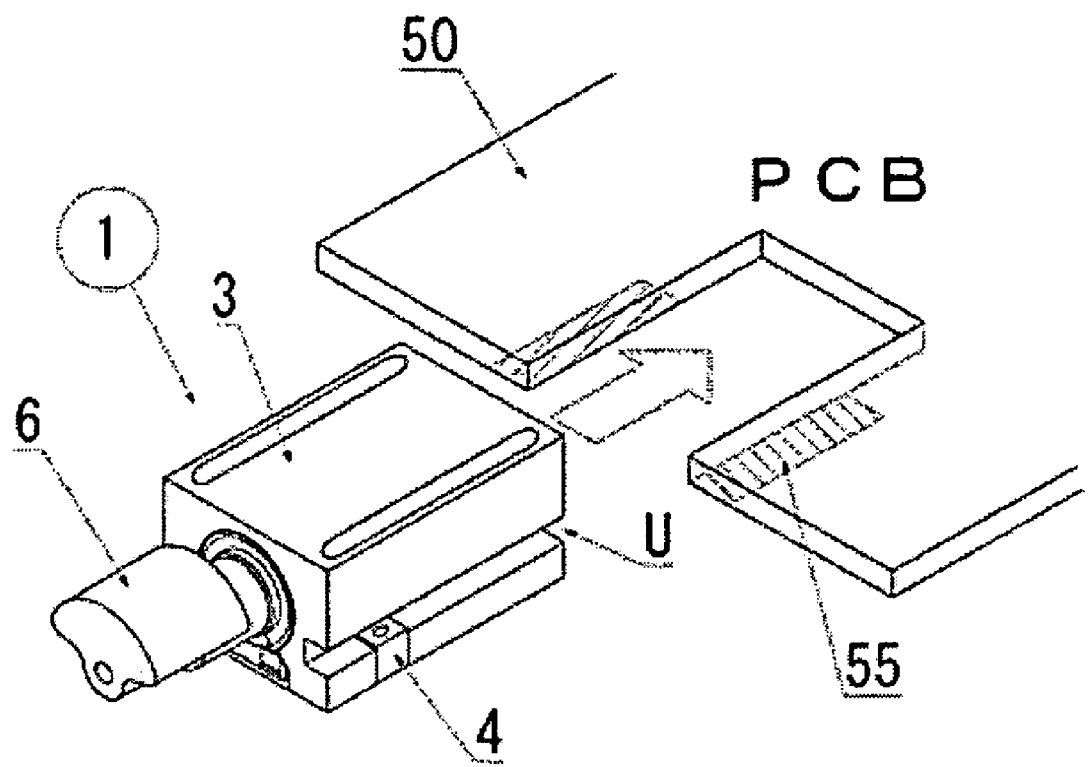
FIG. 2 is a schematic perspective view showing a typical method for mounting a device for generating vibration according to the first embodiment of the invention to a circuit board using a mounting holder.
Figure 3:
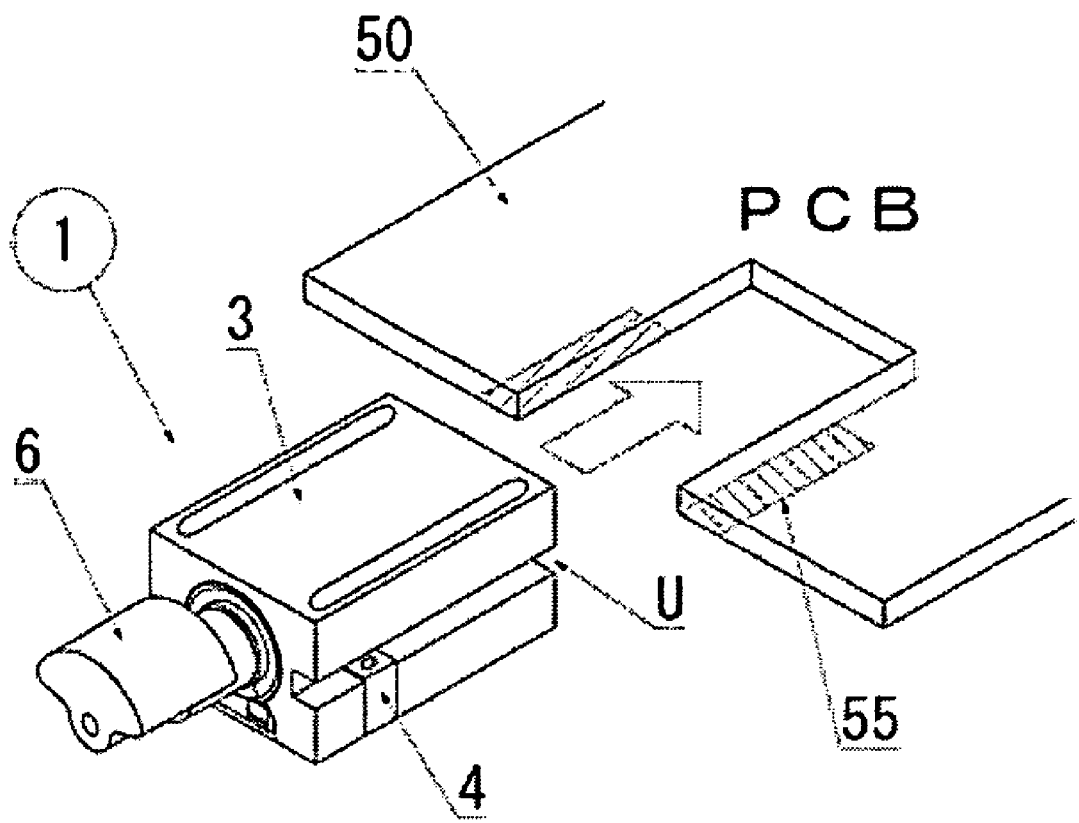
FIG. 3 is a schematic perspective view showing another typical method for mounting a device for generating vibration according to the first embodiment of the invention to a circuit board using a mounting holder.

More specifically, the edges of the cut off circuit board 50 can be inserted into the groove-like rail sections U provided at an arbitrary vertical position of the sides of the holder 3 to fix the device for generating vibration at an arbitrary vertical position, for example, as shown in FIGS. 2 and 3. In this case, it is possible to use the device for generating vibration in different models simply by changing a power supply terminal 4 mounted to a connecting section 4e and the position of the grooves of the holder 3 itself without changing the basic design of the main unit of the device for generating vibration to easily change the design depending on a model change of a mobile communications device while substantially reducing costs.

In addition to the above-described effect, the invention provides a mounting holder, wherein a power supply land of the circuit board and a power supply terminal of the device for generating vibration are firmly pressed onto each other using the elasticity of a mounting component used as a holder by an action of assembling the split device housing so as to be electrically connected when the device for generating vibration is installed on the circuit board inside the device housing.

More specifically, when a device for generating vibration 1 is installed on a circuit board 50, a power supply terminal 4 is pressed onto a power supply land 55 of the circuit board 50 so as to be firmly connected to the inside of the device for generating vibration electrically by holding the holder 3 inside a housing of the device main unit by the circuit board 50 using groove-like rail sections, for example, as shown in FIGS. 1, 2 and 3. Moreover, when the device for generating vibration 1 is arranged inside the device main unit, it is possible to reduce contact friction between the power supply land 55 of the circuit board 50 and a contact section of the power supply terminal 4 to solve such problems as insufficient continuity.

In addition to the above-described effects, the invention further provides a mounting holder, wherein a mounting component of the holder is made of a rubber type elastic material or a resin type insulation material for easy installation on the circuit board 50.

Figure 4:
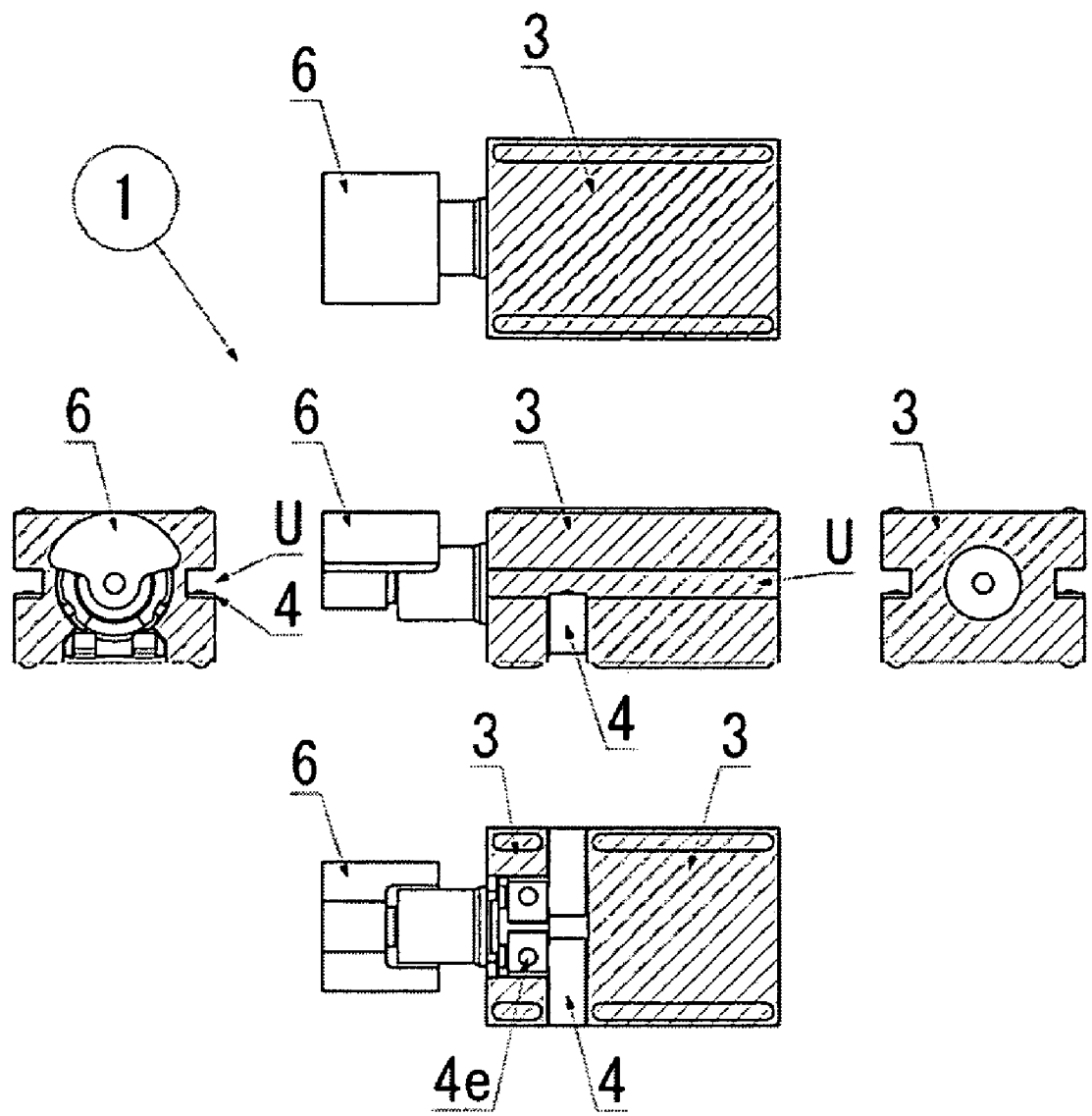
FIG. 4 is a schematic five-face view of appearance of a mounting holder for a device for generating vibration according to the invention.

More specifically, a part of the holder 3 for holding a periphery of the device for generating vibration (hatched section) is made of a rubber type elastic material and assembled with the circuit board 50 to integrally support the device for generating vibration with the circuit board elastically, for example, as shown in FIG. 4. Thus, even if the housing itself is subjected to a shock due to dropping, the external shock load to the main unit of the device for generating vibration can be reduced and the vibration force of the device for generating vibration can be transmitted to the outside of the device main unit through the elastic member.

In addition to the above-described effect, the invention further provides a mounting holder, wherein wing-shaped protrusions are provided to both sides of the holder at the same vertical position, and one surface of each wing-shaped protrusion is soldered to a solder reflow fixing surface positioned at an internal side edge of the cut off circuit board, thus firmly holding the device for generating vibration at an arbitrary vertical position against the surface of the circuit board in the housing.

Figure 5:
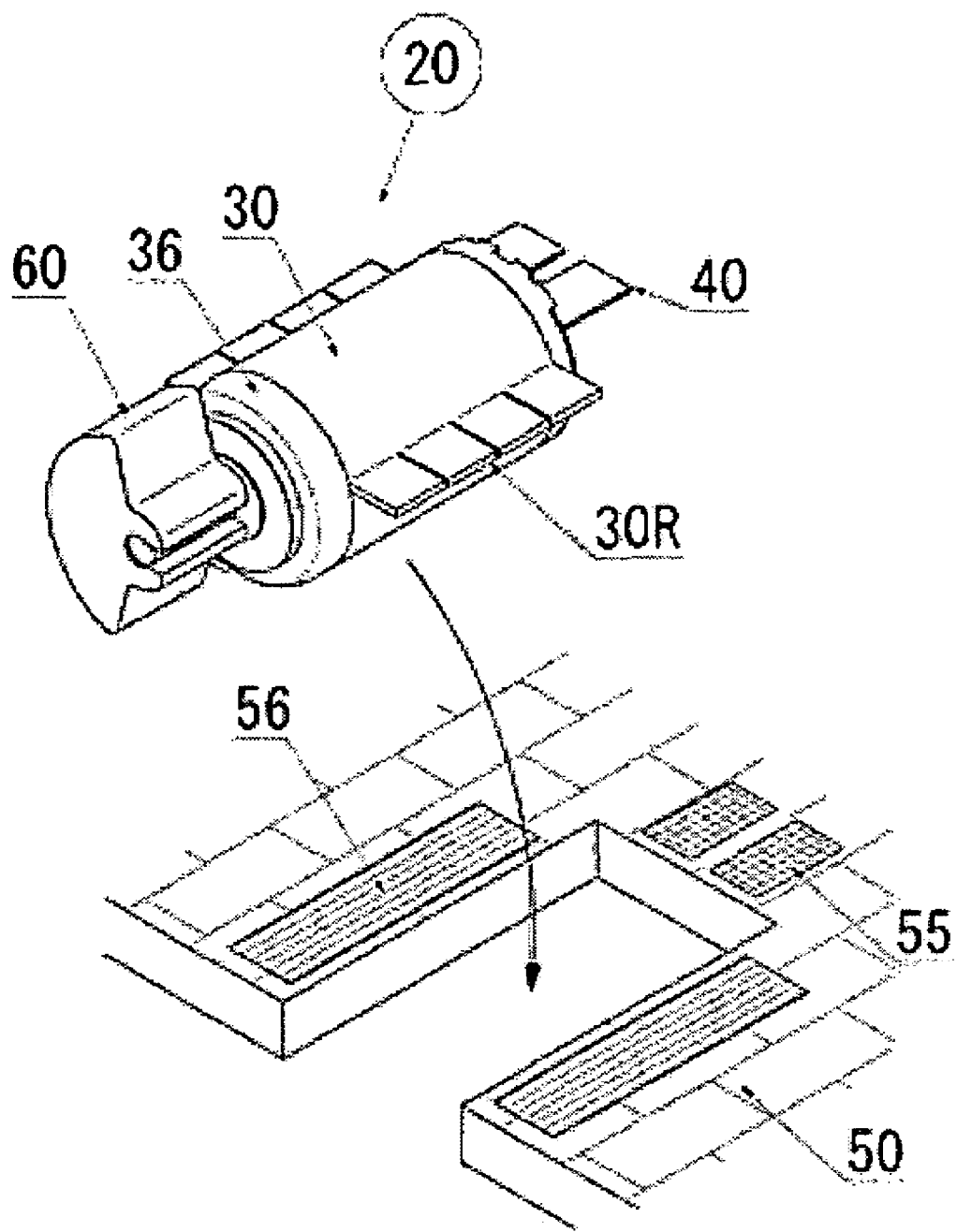
FIG. 5 is a schematic perspective view showing a typical method for mounting a device for generating vibration according to the second embodiment of the invention to a circuit board using a mounting holder.

More specifically, wing-shaped protrusions 30R can be provided to both sides of a holder 30 for holding the device for generating vibration and directly soldered to solder reflow fixing surfaces 56 of the circuit board 50, for example, as shown in FIG. 5. At this time a power supply terminal 40 of the device for generating vibration can be simultaneously connected to a power supply land 55 of the circuit board 50 through solder reflow processing.

Since the holder is installed on the circuit board surface downward in the vertical direction but not by sliding in the horizontal direction, it is possible to load the devices on an automated line in a manner similar to conventional electronic parts.

In addition to the above-described effect, the invention further provides a mounting holder, wherein a member for mounting a holder made of a metal material or a spring-like metal material forms a holding structure with higher resistance to heat generated by solder reflow.

Figure 6:
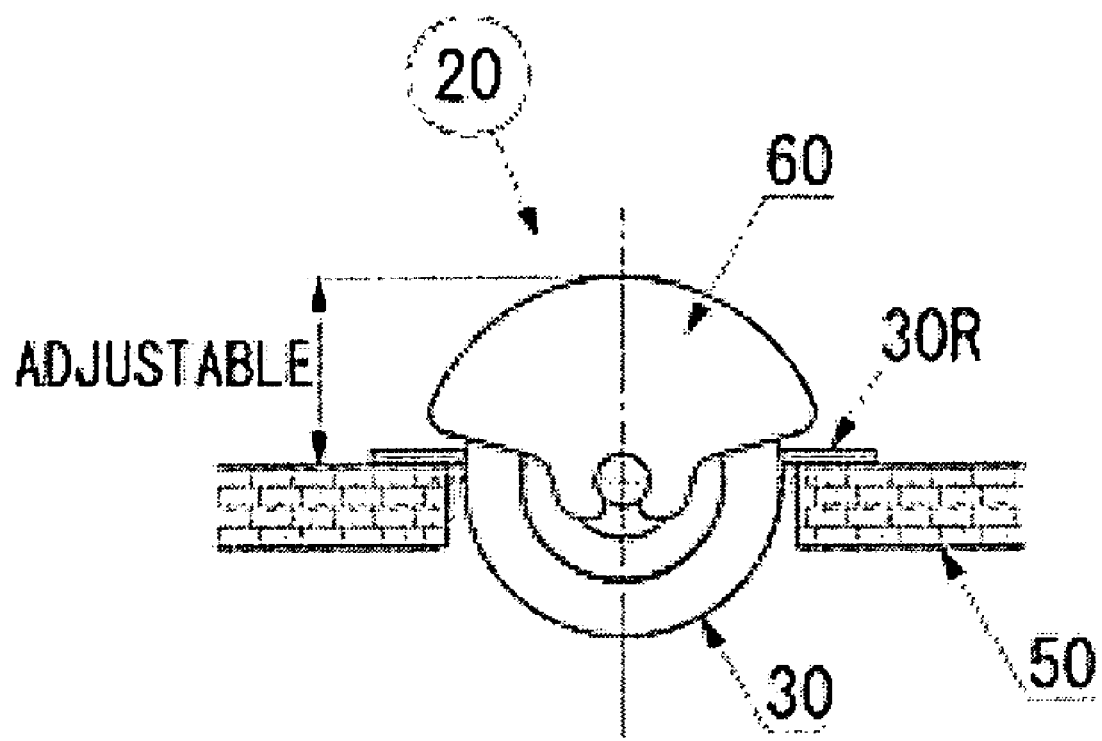
FIG. 6 is a schematic view showing a typical method for mounting a device for generating vibration according to the second embodiment of the invention to a circuit board using a mounting holder.

More specifically, it is possible to solder the protrusions 30R of the holder 30 directly to a solder reflow fixing surface 56 of a circuit board 50 to firmly mount a device for generating vibration 1 by using the holder 30 itself made of a metal material, for example, as shown in FIGS. 5 and 6. In a mounting method using solder reflow, the holder is automatically mounted to the circuit board 50 by a mounting apparatus and subjected to heat treatment in a reflow furnace without deforming the holder itself.

Figure 7:
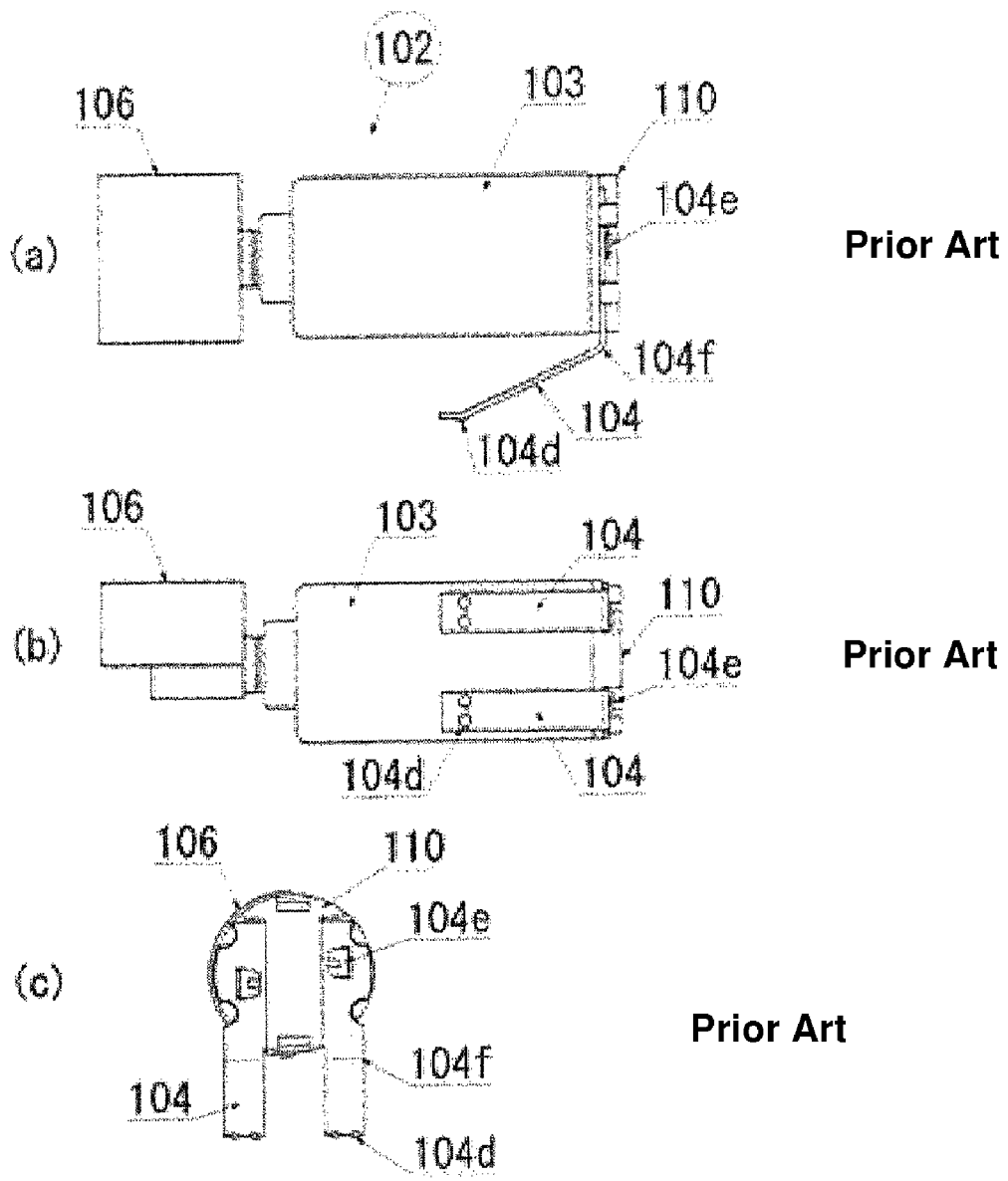
FIGS. 7(*a*), 7(*b*) and 7(*c*) are schematic views showing a typical conventional device for generating vibration (vibration motor).
Figure 8:
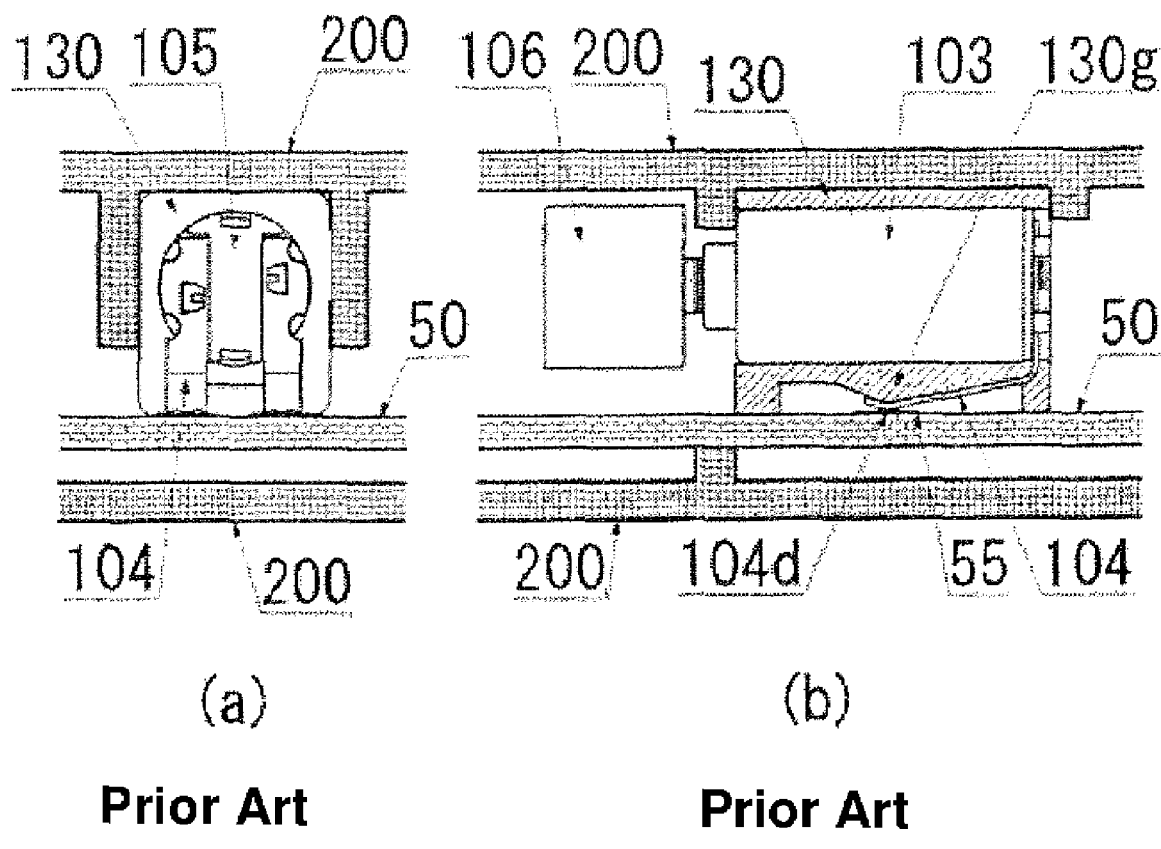
FIGS. 8(*a*) and 8(*b*) are schematic views showing a typical method for mounting a device for generating vibration to a circuit board using a mounting holder.
Figure 9:
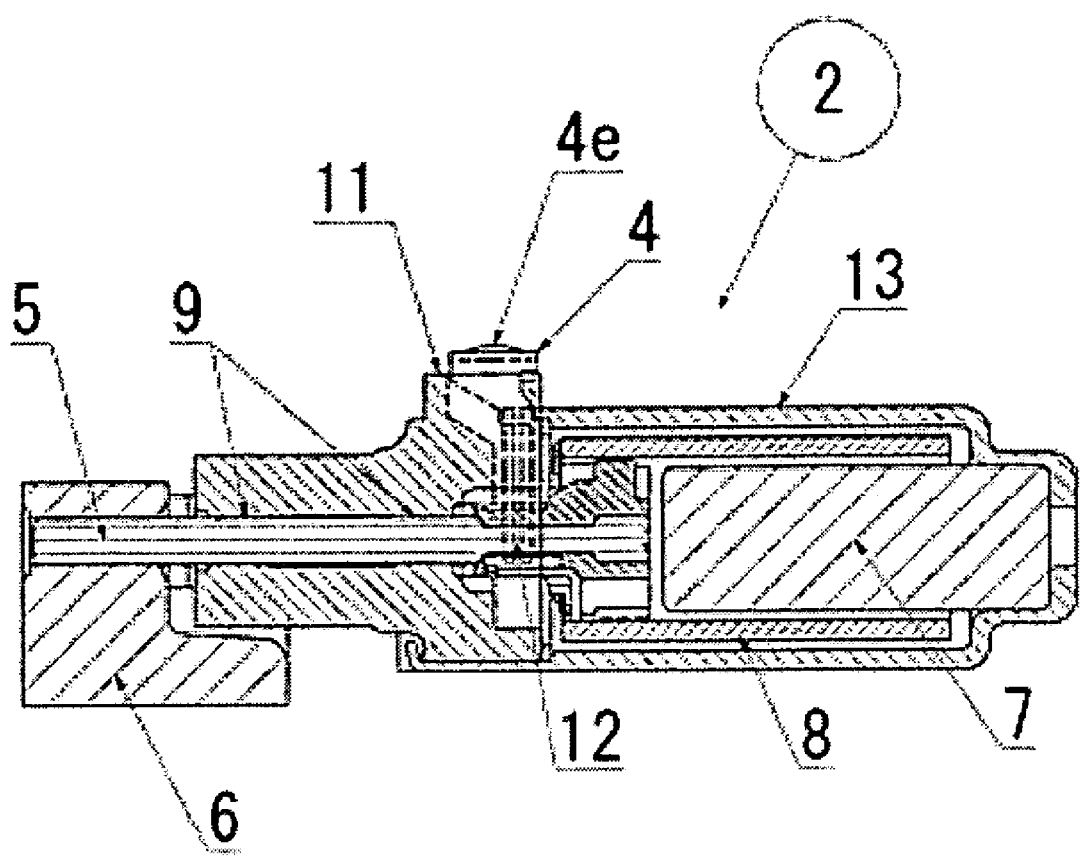
FIG. 9 is a schematic cross-sectional view showing an internal structure of a vibration motor used for a device for generating vibration according to the first embodiment of the invention.

Configuration of the first embodiment according to the invention is hereafter described while referring to FIGS. 1 through 4. In this first embodiment, a coreless type cylindrical vibration motor having a rotation shaft attached with an eccentric weight is explained as an example of an embodiment of a device for generating vibration. Also, a vibration motor 2 according to this embodiment has a structure in which an entire power supply mechanism including a terminal block 11 (especially a connecting section 4e) is arranged close to a weight 6 in a central section of a motor body as shown in FIGS. 4 and 9, differing from a conventional motor structure shown in FIGS. 7 and 8.

An eccentric weight 6 is attached to an end of a rotation shaft 5 of this vibration motor 2, and a rotor section for driving the rotation shaft 5 is accommodated and arranged inside a housing 13 while supported by bearings 9. A motor drive mechanism mainly consists of the housing 13 of a stator, the terminal block 11 for holding a power supply terminal 4, the bearings 9 and a magnet 7, as well as the rotation shaft 5 of the rotor, a wound coil 8 and an electrical commutation mechanism 12 that integrally connects the rotation shaft 5 and the wound coil 8 to drive the rotor. Rotational action of this rotor section provides the weight 6 with gyratory motion to generate vibration force.

FIG. 1 is a schematic diagram showing three patterns as examples in the embodiment according to the invention. A mounting position of the vibration motor 2 is determined by arbitrarily adjusting a ratio of an upper dimension to a lower dimension of the device for generating vibration against the surface of the circuit board 50 depending on dimensions of neighboring electronic parts so as to be, for example, F to G, E to E, and H to J shown in (a), (b), and (c) of FIG. 1. The advantages of this design are that the insertion positions of the circuit board to the holder 3 can be adjusted by changing the position of the groove-like rail sections without changing the shape of the rail sections as shown by these three patterns, thus satisfying various specifications. Naturally, a model of the vibration motor 2 and main parts can be commonly used.

Thus, a thickness of a mobile communications device can be reduced in comparison with that of a device using a conventional mounting method, a device for generating vibration can be mounted inside a housing of a device main unit without reducing a diameter of the device for generating vibration, and vibration force almost equal to that of a motor having a conventional size can be obtained without changing a size and a diameter of the vibration generating weight 6.

FIGS. 2 and 3 show a direction in which the circuit board 50 is inserted into the device for generating vibration 1. Both internal side edges of a cut off section of the circuit board 50 are inserted into the groove-like rail sections U of the holder 3 in the direction shown by an arrow to fix the device for generating vibration 1 in the cut off space of the circuit board 50.

The holder 3 is designed so as to cover almost the entire outer periphery of the vibration motor while allowing a part of the motor body and the weight 6 to be exposed as shown by, for example, the hatched areas in FIG. 4. When the circuit board 50 is installed onto the holder 3, the power supply terminals 4 are mounted on one side wall of each groove-like rail section U between the circuit board surface and the side wall as shown in FIG. 1.

The entire holder 3 is held between the upper and lower parts of a split housing of the device main unit (not illustrated) with the circuit board 50 installed. In order to actually retain the holder 3, it is important to control the accuracy of the dimensions, including a thickness of the circuit board 50 and a width of the groove of the rail section U of the holder 3 prior to assembling the holder with the circuit board 50. Thus, in this embodiment, the holder 3 is made of a rubber type elastic material in order to enable good contact between the holder 3 and the circuit board 50, facilitate assembly, and maintain a constant pressing force onto the power supply terminal 4.

Now, the configuration of the second embodiment according to the invention is described while referring to FIGS. 5 and 6. In this second embodiment, a general cylindrical vibration motor having a rotation shaft attached with an eccentric weight is described as an embodiment of a device for generating vibration. A vibration motor according to this embodiment has a structure in which a power supply mechanism is located at an opposite side of a weight 6 and power supply terminals 40 axially protrude from an end surface of a cylindrical motor body.

The circuit board 50 has a cut off space as shown in FIG. 5. Solder reflow fixing surfaces 56 that can be soldered are arranged on both sides of the cut off space close to the internal side edges, and power supply lands 55 connected to power supply terminals 40 are mounted on the surface of the circuit board 50 common to the solder reflow fixing surfaces. A vibration motor 20 has a holder, wherein wing-shaped protrusions 30R made by press-forming a metal sheet are provided on an outer periphery of a split cylindrical body. The vibration motor 20 retained by this holder 30 is inserted into the cut off space of the circuit board 50 in a direction different from that in the first embodiment. That is to say, the vibration motor 20 is inserted downward into the cut off space of the circuit board. Thus it is possible to use an automated line equipped with, for example, a mounting apparatus in an assembly process during mass production.

In this method, cream solder layers are provided on the solder reflow fixing surfaces 56 and the surfaces of the power supply land 55 of the circuit board 50 in advance, and the vibration motor 20 is placed on the circuit board 50 and tacked as shown in FIG. 6. At this time, a vertical position of the vibration motor 20 against the surface of the circuit board 50 is adjustable by changing the vertical position of the protrusions 30R. By using a solder reflow furnace for heat treatment, the circuit board 50 and the vibration motor 20 are bonded and fixed through the holder 30.

It is natural that each component of the vibration motor 20 is required to have heat resistance because the assembly described above, including the vibration motor 20 itself, is subjected to a temperature of 200° C. or more in the solder reflow furnace. For the same reason, the holder 30 is basically made of stainless steel type metal material. It is preferable to insert a heat resistant elastic sheet 36 between the holder 30 and the vibration motor body (at an outer periphery of a housing case) while also expecting a heat insulation effect (not illustrated in detail).

In this second embodiment, since the vibration motor 20 is directly mounted with solder to the circuit board 50 through the metallic holder 30, vibration is transmitted to the housing of the device main unit through the circuit board 50. The holder is not necessarily required to cover the entire vibration motor 20 and can have a structure on which the vibration motor 20 is hung. It is not necessary to install the holder section onto the vibration motor 20 if the positional relation between the circuit board 50 and the vibration motor 20 can be maintained. The vibration motor 20 can be mounted onto the holder section attached to the circuit board 50 to obtain the same effect for the same purpose.

This invention can be modified in various ways based on the technical idea shown in the above embodiments. Needless to say, various types of devices for generating vibrations, such as a flat type vibration motor with a rotation shaft and a stationary shaft, a multi-function device, a vibration linear device, and a vibration actuator in addition to the cylindrical vibration motor referred to in this embodiment can be applied to the vibration generating mechanism.

The device for generating vibration with the holder according to this invention can be mounted in general electronic devices requiring a vibration alarm function, such as a multi-functional mobile phone including a camera-equipped mobile phone, a wristwatch type PHS, a mobile communications device including an in-plant small wireless transmitter, various information communication terminals including a mobile PDA, and electronic toys including a game machine controller with a vibration function and a pocket video game machine.

While preferred embodiments of the invention have been described above, it is to be understood that variations and modifications will be apparent to those skilled in the art without departing from the scope and spirit of the invention. The scope of the invention, therefore, is to be determined solely by the following claims.

The invention claimed is:

1. A holder for mounting a device for generating vibration in a circuit board to be mounted in a housing of a portable apparatus, said holder comprising:

a holder body for supporting the device for generating vibration by encasing a part of an outer periphery of the device for generating vibration, said holder body includes two vertical external side surfaces, a mounting U-shaped groove formed in each of the two vertical external side surfaces at an arbitrary height for fixing the device for generating vibration to the circuit board having an open ended cutout with power supply lands, and a power supply terminal disposed on a surface of at least one of the U-shaped grooves in the holder, said power supply terminal being connected to the respective power supply lands on the circuit board when the housing with the device for generating vibration is mounted on the circuit board.

2. A holder for mounting a device for generating vibration according to claim 1, wherein an inner peripheral surface of said holder body is formed in a shape substantially conforming to an outer periphery of the device for generating vibration, and side edges of said cut off circuit board are inserted into said U-shaped groove, thus holding and securing said device for generating vibration at an arbitrary vertical position against said surface of said circuit board.

3. A holder for mounting a device for generating vibration according to claim 2, wherein said power supply land of said circuit board and said power supply terminal of said device for generating vibration are pressed onto each other using elasticity of said holder so as to be electrically connected when said device for generating vibration is installed on said circuit board.

4. A holder for mounting a device for generating vibration according to claim 2, wherein said holder is made of a rubber type elastic material or a resin type insulation material.

5. A holder for mounting a device for generating vibration according to claim 2, wherein said holder is made of a metal material or a spring-like metal material.

6. A holder for mounting a device for generating vibration according to claim 1, wherein said power supply land of said circuit board and said power supply terminal of said device for generating vibration are pressed onto each other using elasticity of said holder so as to be electrically connected when said device for generating vibration is installed on said circuit board.

7. A holder for mounting a device for generating vibration according to claim 6, wherein said holder is made of a rubber type elastic material or a resin type insulation material.

8. A holder for mounting a device for generating vibration according to claim 1, wherein said holder is made of a rubber type elastic material or a resin type insulation material.

9. A holder for mounting a device for generating vibration according to claim 1, wherein said holder is made of a metal material or a spring-like metal material.

10. A holder for mounting a device for generating vibration, the holder comprising:
    wing-shaped flange sections provided at an outer peripheral surface of said holder at a same vertical position, each wing-shaped flange section being positioned on an opposite side of the outer peripheral surface of the holder at an arbitrary height for fixing the device for generating vibration to a circuit board having an open ended cutout with reflow fixing surfaces and power lands, and
    power supply terminals provided on the device for generating vibration, wherein a surface of said wing-shaped flange sections is soldered to a solder reflow fixing surface positioned on the circuit board, and said power supply terminals are soldered to said respective power lands on the circuit board, thus holding and fixing said device for generating vibration at an arbitrary vertical position against said surface of said circuit board,
    wherein the holder having a shape substantially conforming to the outer peripheral surface of the device for generating vibration.

11. A holder for mounting a device for generating vibration according to claim 10, wherein said holder is made of a metal material or a spring-like metal material.

* * * * *